US010282754B2

(12) United States Patent
Bares et al.

(10) Patent No.: US 10,282,754 B2
(45) Date of Patent: May 7, 2019

(54) COMMERCIAL INFORMATION TAGGING

(75) Inventors: Jeremy M. Bares, Tucson, AZ (US); Laura M. Reid, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 12/912,606

(22) Filed: Oct. 26, 2010

(65) Prior Publication Data

US 2012/0101902 A1  Apr. 26, 2012

(51) Int. Cl.
| | |
|---|---|
| *G06Q 30/00* | (2012.01) |
| *G06Q 30/02* | (2012.01) |
| *H04H 60/70* | (2008.01) |
| *H04H 60/73* | (2008.01) |
| *H04H 60/80* | (2008.01) |
| *H04H 20/28* | (2008.01) |
| *H04H 60/63* | (2008.01) |

(52) U.S. Cl.
CPC ..... *G06Q 30/0267* (2013.01); *G06Q 30/0241* (2013.01); *H04H 60/70* (2013.01); *H04H 60/73* (2013.01); *H04H 60/80* (2013.01); *H04H 20/28* (2013.01); *H04H 60/63* (2013.01)

(58) Field of Classification Search
CPC ........... G06Q 30/0241; G06Q 30/0267; H04H 60/63; H04H 60/70; H04H 60/73; H04H 60/80; H04H 20/28
USPC ...................... 705/14, 14.4, 14.64
See application file for complete search history.

(56) References Cited

U.S. PATENT DOCUMENTS

| | | | |
|---|---|---|---|
| 6,163,683 A | 12/2000 | Dunn et al. | |
| 6,317,784 B1 | 11/2001 | Mackintosh et al. | |
| 6,799,201 B1 | 9/2004 | Lee et al. | |
| 6,952,559 B2 | 10/2005 | Bates et al. | |
| 2003/0079234 A1* | 4/2003 | Rasmussen | H04N 5/4401 725/153 |
| 2006/0089160 A1* | 4/2006 | Othmer | H04M 1/72572 455/457 |
| 2006/0184960 A1* | 8/2006 | Horton | G06Q 30/00 725/25 |

(Continued)

OTHER PUBLICATIONS

Horwitz, Jeremy, iPhone Gems: "Free" SMS and MMS Alternatives for iPhone and iPod touch, dated Feb. 18, 2009, downloaded from http://www.ilounge.com/index.php/articles/comments/iphone-gems-free-sms-and-mms-alternatives-for-iphone-and-ipad-touch on Sep. 7, 2016 (hereinafter Horwitz).*

(Continued)

*Primary Examiner* — Scott D Gartland
(74) *Attorney, Agent, or Firm* — Kunzler, PC

(57) ABSTRACT

An approach to commercial information tagging. A digital radio receiver may be configured to receive commercial metadata that is part of a digital radio stream. A user may be able to provide input indicating that a particular commercial is of interest, thereby selecting the commercial metadata. The digital radio receiver may then determine one or more devices, from a set of devices that are communicatively connected to the digital radio receiver, that are configured to receive advertising associated with the commercial metadata. The digital radio receiver may then transmit the advertising to the various devices. In response, the devices may display information about the entity that sponsored the particular commercial; for example, a cellular phone may display a coupon, while a GPS device displays directions to the nearest location.

19 Claims, 5 Drawing Sheets

(56) References Cited

U.S. PATENT DOCUMENTS

| | | |
|---|---|---|
| 2006/0212899 A1 | 9/2006 | Steelberg et al. |
| 2007/0206627 A1 | 9/2007 | Harrison |
| 2007/0248055 A1 | 10/2007 | Jain et al. |
| 2008/0098423 A1 | 4/2008 | Malik |
| 2008/0183757 A1 | 7/2008 | Dorogusker et al. |
| 2009/0070597 A1 | 3/2009 | Shah et al. |
| 2009/0281897 A1 | 11/2009 | Antos |
| 2011/0202270 A1* | 8/2011 | Sharma et al. ............... 701/201 |

OTHER PUBLICATIONS

How to Write Advertisements that Sell, A. W. Shaw Co., from System, the magazine of Business, dated 1912.*

Stadel, Luke, Radio/Television/Sound: Radio Aesthetics and Perceptual Technics in Early American Television, Journal of e-Media Studies, vol. 5, Issue 1, 2016 Dartmouth College (Year: 2016).*

How to Listen to TV on a Radio, WikiHow, downloaded May 28, 2018 from https://www.wikihow.com/Listen-to-TV-on-a-Radio (Year: 2018).*

Toothman, Jessika, How Bluetooth Car Stereos Work, dated Jan. 20, 2009, downloaded from https://electronics.howstuffworks.com/gadgets/automotive/bluetooth-car-stereo.htm on Dec. 6, 2018 (Year: 2009).*

Franklin, Curt and Layton, Julia, How Bluetooth Works, dated Jun. 28, 2000, downloaded from https://electronics.howstuffworks.com/bluetooth.htm on Dec. 6, 2018 (Year: 2000).*

Gunther Schatter, "The Computerization of Digital Audio Broadcasting Receivers and the Demand for Empathic Interface Solutions", URL: http://webuser.uni-weimar.de/~schatter/txt/10wksh-tui09-computer.pdf, downloaded on Aug. 5, 2010.

\* cited by examiner

COMMERCIAL INFORMATION TAGGING

FIELD

The subject matter disclosed herein relates to tagging commercial information transmitted to a radio.

BACKGROUND

Description of the Related Art

Digital radio is becoming increasingly widespread. In addition to transmitting audio information, digital radio can transmit content metadata. Content metadata is data about the audio content being presented on the radio. For example, content metadata may identify the name of a song, the artist, the album, or other such metadata. Many digital radio receivers allow users to "tag" a song that is playing on the radio. When a user tags a song, the content metadata is stored in memory for the user, either in the digital radio receiver, on an associated device, or both. For example, a user may tag a particular song. The digital radio receiver may store the content metadata and transfer the content metadata to a device such as an iPod®. When the user connects the iPod® to a computer, software such as iTunes® may list the tagged songs and make them available for purchase.

However, the ability to transmit and use metadata has not been used advantageously for commercial applications. Currently, users cannot interact effectively with the commercial content of digital radio broadcasts.

BRIEF SUMMARY

The present invention allows for tagging commercial radio information. The invention may be realized as an apparatus, a computer program product, a method, a system, or in other forms.

An apparatus for commercial information tagging may be configured to receive commercial metadata that is part of a digital radio stream. The apparatus may also receive, from a user, user input selecting the commercial metadata. For example, the user may provide the input using a "tag" button of a digital radio receiver. The apparatus may also determine one or more devices, from a set of devices that are communicatively connected to the digital radio receiver, that are configured to receive, from the digital radio receiver, advertising that is associated with the commercial metadata. The apparatus may transmit the advertising associated with the commercial metadata to the one or more devices that are configured to receive the advertising. The apparatus may be part of a digital radio receiver. The digital radio receiver may be contained within the same physical case as some of the devices to which the digital radio receiver sends advertising.

The advertising may include any information which promotes a good or service, including (but not limited to) a coupon, a promotion, a location, directions to a location, and contact information. In embodiments where the advertising is a location, and where at least one of the devices is a GPS device, the GPS device may display the location for the user upon receiving the advertising from the digital radio receiver. Other examples of devices include cellular phones, digital music players, printers, and computers. The digital radio receiver may transmit the advertising to devices using MMS, electronic mail, or other approaches to information exchange. The devices may select one or more components of the commercial information to present to the user; for example, the GPS device may choose to present a location component of advertising, but not a coupon component of the advertising.

The invention may also be realized as part of a system. The system may include a broadcast system that is configured to broadcast a digital radio stream containing commercial metadata. The system may also include a digital radio receiver as described above, along with devices which can receive advertising from the digital radio receiver and display that advertising to the user. The invention may also be realized as a method.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
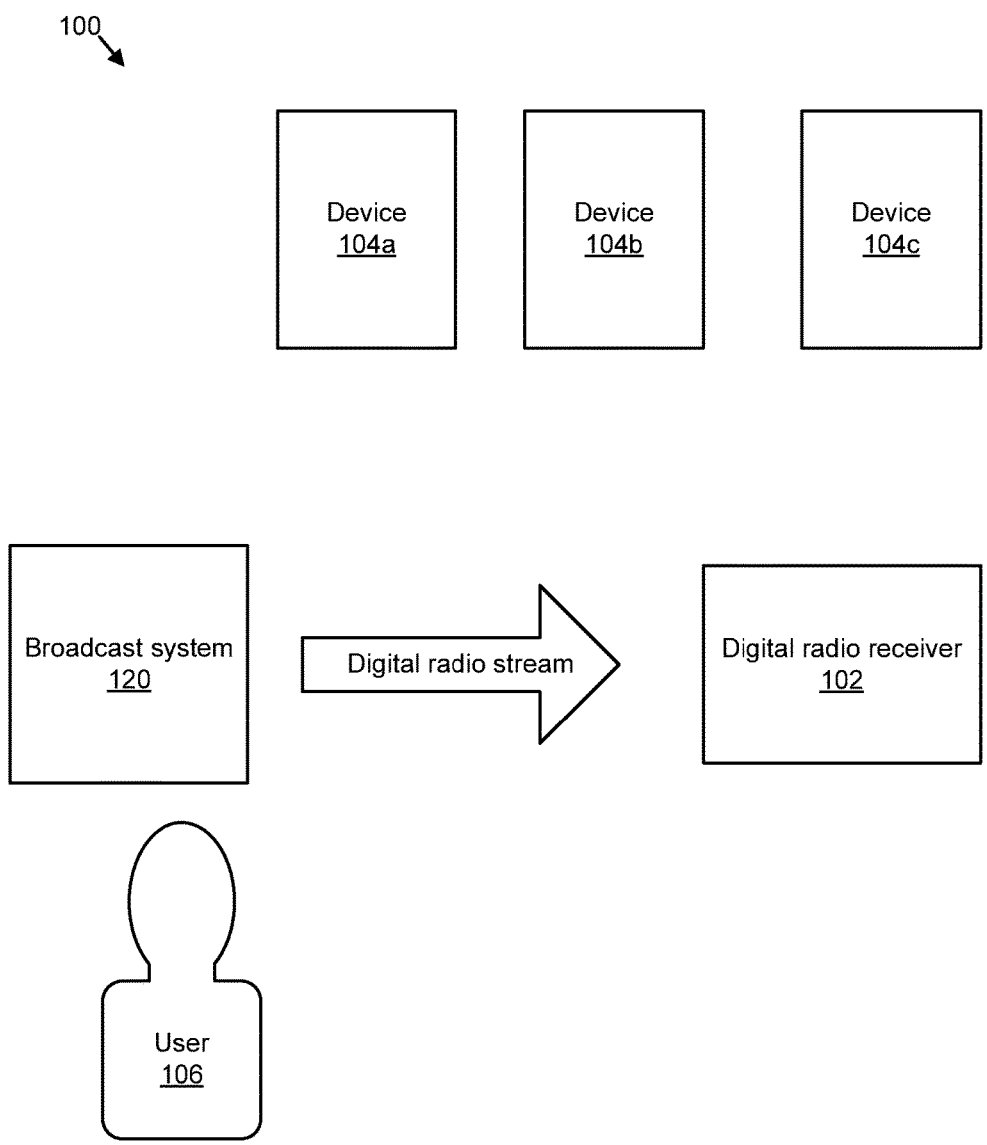
FIG. 1 is a schematic block diagram illustrating one embodiment of a system for commercial information tagging.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor. Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 for tagging commercial metadata in a digital radio environment. The system 100 includes devices 104a-c, a digital radio receiver 102, a broadcast system 120, and a user 106.

The devices 104a-c may be any variety of devices with memory and which can display data for a user 106. The devices 104a-c may be, for example, cell phones, digital music players, GPS systems, printers, computers, or other appropriate devices. In certain embodiments, the devices 104a-c communicate with the digital radio receiver 102 over a wireless communications connection. Examples of wireless communications connections include wireless Internet based on the IEEE 802.11 standards, Bluetooth, or other. In certain embodiments, the devices 104a-c communicate with the digital radio receiver 102 using a wired connection such as a network connection or a bus connection. The devices 104a-c may be detachable from the digital radio receiver 102 and the wired connection between them; in other embodiments, the digital radio receiver 102 and one or more devices 104a-c are not meant to be disconnected, as described further below.

The broadcast system 120 generates a digital radio stream that is received by a digital radio receiver 102. The broadcast system 120 may be part of a radio station's physical facilities. Approaches for generating and broadcasting a digital radio stream are known in the art.

The digital radio stream includes both data and metadata. The digital radio stream may be divided into content data and commercial data. Content data encompasses all data that is the content of the digital radio stream. Content data may include music, radio talk shows, and other forms of content. Commercial data encompasses advertising. The commercial data may be traditional 30-second advertising spots, long form advertising programs, or other form of audio advertising.

Similarly, the digital radio stream may include both content metadata and commercial metadata. Content metadata is digital metadata that is related to the content data of the digital radio stream; for example, song metadata (song name, artist name, etc) is an example of content metadata. In contrast, commercial metadata is digital metadata that is related to the commercial data in the digital radio stream, such as advertising. Commercial metadata, as that term is used in this application, does not include content metadata. The digital radio receiver 102 receives the digital radio stream and presents it to the user. The digital radio receiver 102 may present the content data and commercial data to the user 106 as audio output. The digital radio receiver 102 may include a display on which it can present content metadata and commercial metadata to the user 106. For example, the digital radio receiver 102 may have a display on which it can display the name of a song, or the name of a company sponsoring an advertisement.

The digital radio receiver 102 is also configured to accept input from a user 106. The user may select a particular segment of the content data; for example, the user may tag a song. The digital radio receiver 102 may, in response, send the content metadata associated with the content data selected by the user 106 to one or more devices 104a-c. For example, the digital radio receiver 102 may add the song to a playlist of a device 104a-c that is a digital music player. The user 106 may also select a particular segment of commercial data by providing input to the digital radio receiver 102. A user 106 may tag an advertisement, causing the digital radio receiver 102 to transmit advertising associated with the commercial metadata to one or more of the devices 104a-c.

Advertising that is transmitted is used broadly in this application to encompass a variety of information that may be used as advertising. The advertising may be a location (such as the location of a store), a coupon, a link to a coupon, a barcode, an audio file, or other variety of advertising.

Thus, in one embodiment, the broadcast system 120 broadcasts a digital radio stream that includes commercial metadata. A digital radio receiver 102 receives the commercial metadata in the digital radio stream. The digital radio receiver 102 may present this commercial metadata to the user 106; in other embodiments, the commercial metadata is not presented to the user 106. The digital radio receiver 102 is also configured to receive user input from the user 106.

The user input may select the commercial metadata by, for example, tagging. The digital radio receiver 102 determines one or more devices 104a-c that are configured to receive, from the digital radio receiver 102, advertising that is associated with the commercial metadata that has been selected by the user 106. The digital radio receiver 102 may then transmit the advertising to the one or more devices 104a-c that are communicatively connected to the digital radio receiver 102. The devices 104a-c, in response, may receive the advertising and present that advertising to the user 106. The manner in which the advertising is presented to the user may vary based on the nature of the device 104a-c. In certain embodiments, the advertising may be a coupon, a promotion, a location, directions to a location, contact information, a pointer to a coupon, executable instructions, or other variety of advertising.

Figure 2:
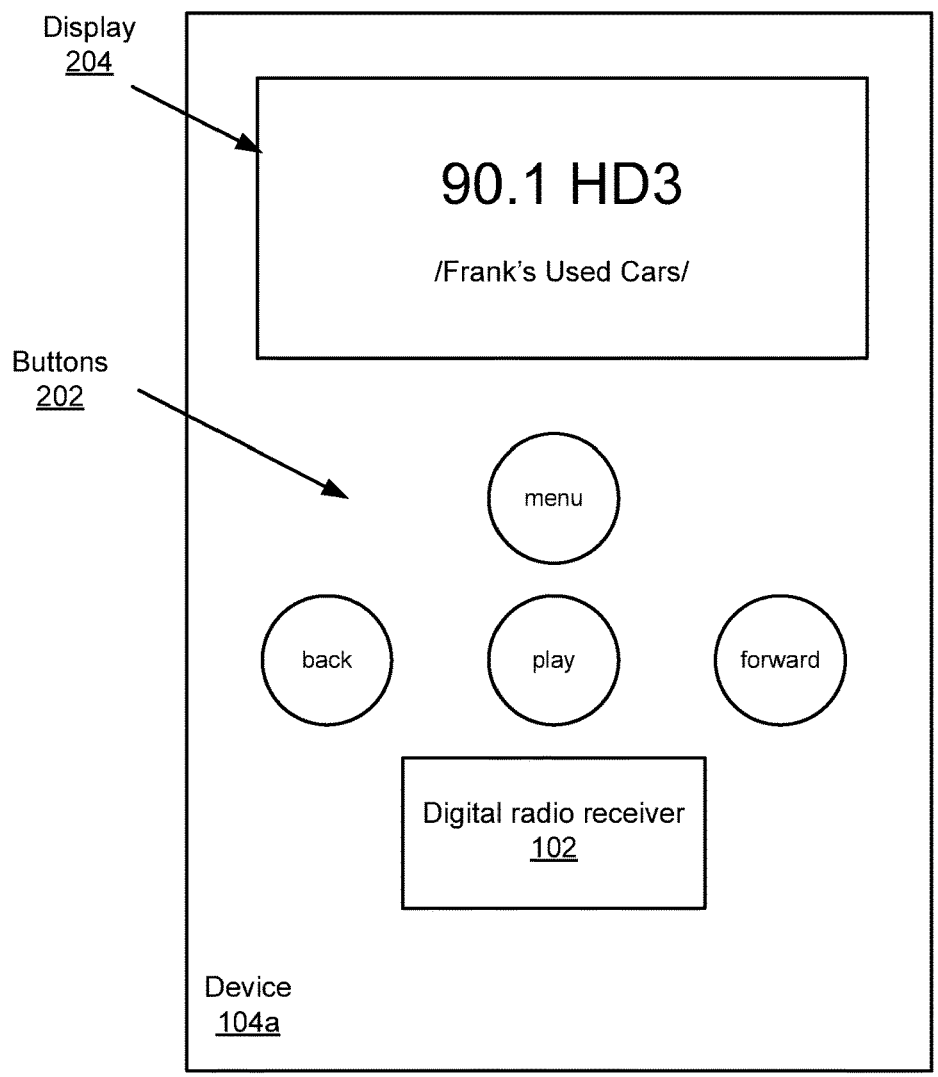
FIG. 2 is a schematic block diagram illustrating another embodiment of a system for commercial information tagging.

FIG. 2 shows an embodiment of a device 104a and a digital radio receiver 102 which are contained in the same physical case. In certain embodiments, the device 104a provides a number of buttons 202 by which the user 106 can provide input. For example, as shown in FIG. 2, the buttons 202 may include a menu button, a back button, a play button, and a forward button. Other types of buttons 202 may be used based on the nature of the device 104a. In certain embodiments, one or more buttons 202 are soft keys which can invoke a number of functions, rather than being associated with a single fixed function. In one embodiment, a button 202 provides tagging functionality and allows the digital radio receiver 102 to receive user input selecting commercial metadata. Certain digital radio receivers 102 may provide a tag button to the user 106 in order to allow the user 106 to provide user input.

For example, the device 104a may display the name of the radio station and information about the current commercial content on a display 204. The user 106 may be interested in the commercial content and press a button 202, such as the menu button, to select the commercial metadata. In response, the digital radio receiver 102 may determine one or more devices 104a-c that are communicatively connected to the digital radio receiver 102 and that are configured to receive advertising associated with the commercial metadata. The digital radio receiver 102 may then transmit that advertising to the one or more devices 104a-c.

In one embodiment, a single device 104a may include one or more devices 104a-c within the same case. For example, the device 104a may have a software application that is GPS system. Such software applications may be considered separate devices 104a-c for purposes of this application. In such an embodiment, the digital radio receiver 102 may send the GPS system software a location using application programming interfaces (APIs) or other approaches for information sharing between software applications within a single physical device 104a. The GPS system software may, in response, store the location for future use, or show the location on the display 204.

The digital radio receiver 102 may broadcast the information to all connected devices 104a-c, and let the devices 104a-c make decisions about how to use the advertising. For example, the same advertising may be sent to a phone and a GPS system, but the phone may decide to open a browser window with a coupon, while the GPS system may decide to save a location in memory. The phone may ignore the location, and the GPS system may ignore the coupon. In other embodiments, the digital radio receiver 102 determines which devices 104a-c should get what portions of the advertising, and the digital radio receiver 102 sends only the relevant advertising to each device 104a-c.

To continue with an example, the user 106 may press the menu button 202 to tag the commercial metadata associated with the audio commercial data (an advertisement for Frank's used cars) being received by the digital radio receiver 102. In response, the digital radio receiver may transmit advertising associated with the commercial metadata to one or more devices 104a-c that are configured to receive the advertising. Thus, the digital radio receiver 102 may send the advertising to a GPS system, which displays the location of Frank's used cars on a display (such as display 204). The digital radio receiver 102 may send advertising to an email account, where the advertising is a coupon or promotion for Frank's used cars. The content of the email may be the coupon itself, or a link to an Internet address from which the recipient can retrieve the coupon.

Figure 3:
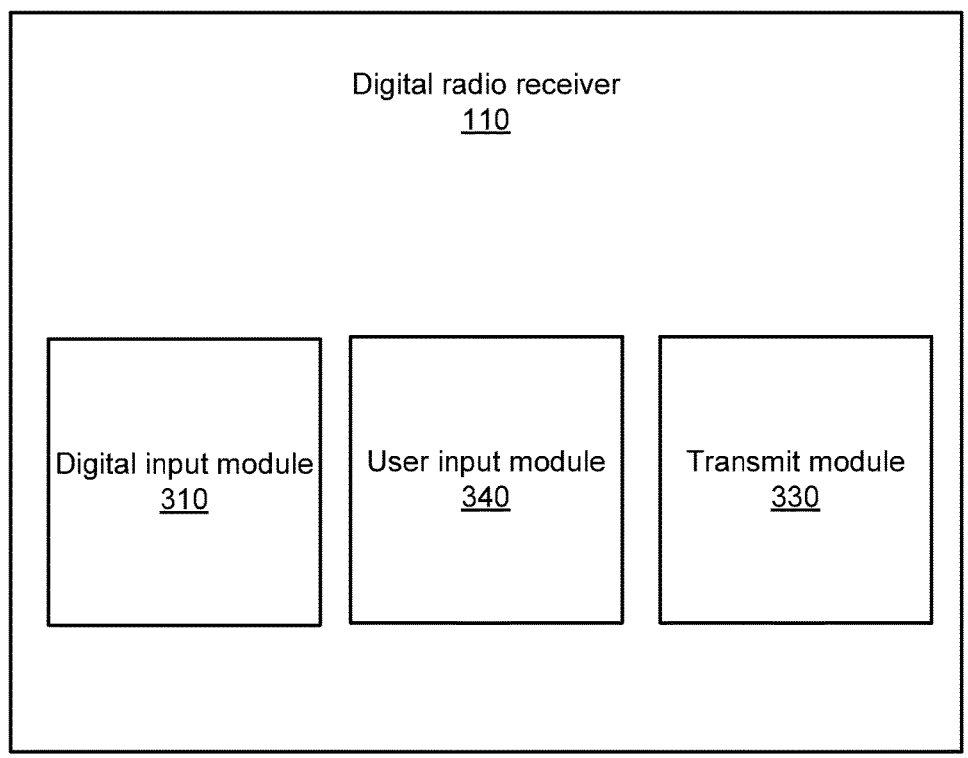
FIG. 3 is a schematic block diagram illustrating one embodiment of a digital radio receiver for commercial information tagging.

FIG. 3 shows one embodiment of a digital radio receiver 110 comprising a digital input module 310, a user input module 340, and a transmit module 330. The digital radio receiver 110 may also include various other software and hardware components known in the art, but which, for simplicity, are not displayed in FIG. 3.

The digital input module 310 may receive the digital radio stream that includes commercial metadata as described above. The commercial metadata may be associated with advertising, as described above. "Advertising" is used broadly in this application to encompass information that is intended to be presented to a user 106 (such as a coupon, or a flyer) and information that is interpreted before it can be presented to the user (such as a data which a GPS device interprets and displays as a location). As noted above, the advertising may include coupons, promotions, locations, directions to a location, contact information, and other information. The advertising may include this information or, alternatively, may contain a pointer to this information. For example, the advertising may include an address (such as an Internet address) from which the advertising may be obtained.

The digital radio receiver 110 may also include a user input module 340. The user input module 340 may receive user input selecting the commercial metadata from a user 106. For example, the user input module 340 may provide a button 202 (such as a tag button) which allows the user 106 to select the commercial metadata.

In response to the user input module 340 receiving user input, the transmit module 350 transmits advertising associated with the commercial metadata to one or more devices 104a-c that are configured to receive advertising. In one embodiment, the transmit module 350 transmits the advertising to the one or more devices 104a-c using multimedia messaging service (MMS). MMS is used broadly in this application to encompass short message service (SMS) and other texting technologies. For example, the transmit module 350 may send a coupon via MMS to a device 104a-c that is a cellular phone.

The transmit module 350 may transmit advertising to one or more devices 104a-c using electronic mail (email). For example, the transmit module 350 may send an email with a location, store hours, to a particular email address. A user 106 may then retrieve that email using a device 104a-c that is a cellular phone, a computer, or other appropriate device 104a-c.

The devices 104a-c may receive the advertising from the transmit module 350 and select one or more components of the advertising to present to the user 106. For example, the advertising may include a coupon component, a location component, and a directions component. A device 104a-c that is a GPS device may receive this advertising and determine that it can present the location component and the direction component. The GPS device may display the location for the user 106, along with directions to the location. The GPS device may determine not to display the coupon component to the user 106. Similarly, a device 104a-c that is a cellular phone may select the coupon component, but not display the location component or the direction component.

Figure 4:
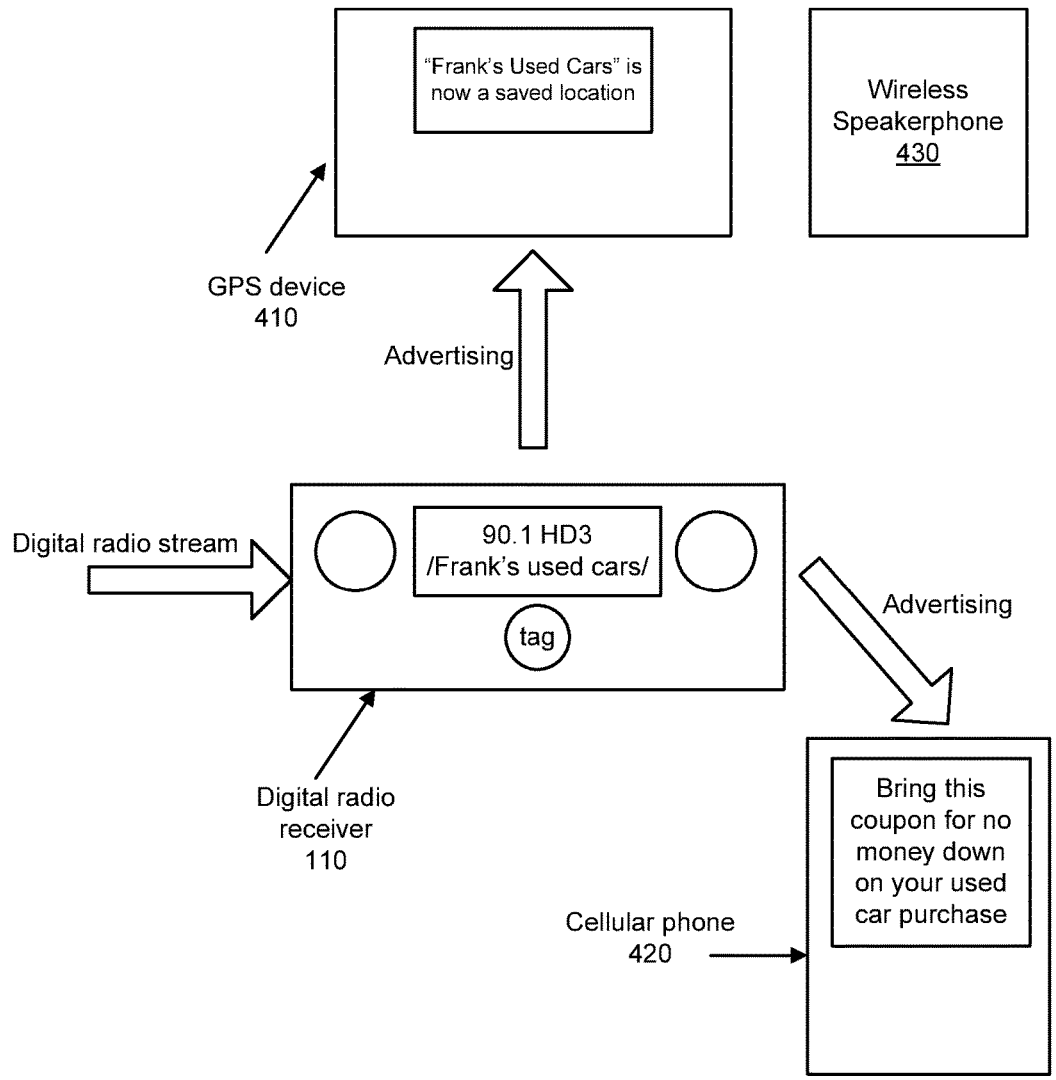
FIG. 4 is a schematic block diagram illustrating one embodiment of a system being used for commercial information tagging.

FIG. 4 illustrates one example of a system in which a digital radio receiver 110 may receive a digital radio stream containing commercial metadata, and in which the digital radio receiver 110 may send advertising associated with the commercial metadata selected by the user to one or more devices 104a-c. In one embodiment, the digital radio receiver 110 may be installed in a car. The car may also include a GPS device 410. Both the digital radio receiver 110 and the GPS device 410 may come pre-installed in a car, and may be configured to communicate information. A user 106 may have a cellular phone 420 which she brings in the car with her, along with a wireless speakerphone 430 on which the user 106 can receive phone calls.

While driving, the user 106 may hear a commercial she is interested in. In response, the user 106 may hit a "tag" button 202 to indicate that she is interested in the commercial. In this manner, the user may select the commercial metadata in the digital radio stream. In response, the digital radio receiver 110 may determine one or more devices that are communicatively connected to the digital radio receiver 110 that are configured to receive advertising associated with the commercial metadata. For example, the digital radio receiver 110 may determine that it is communicatively connected to the GPS device 410. The digital radio receiver 110 may also determine that it is communicatively connected (for example, by a Bluetooth connection) to the cellular phone 420. The digital radio receiver 110 may also determine that the GPS device 410 and the cellular phone 420 are configured to receive advertising. The digital radio receiver 110 may communicatively connected to the wireless speakerphone 430 (for example, phone calls may be routed through the speakers of the digital radio receiver 110); however, the digital radio receiver 110 may determine that the wireless speakerphone 430 is not configured to receive advertising.

The digital radio receiver 110 may then transmit advertising to the GPS device 410 and to the cellular phone 420. In one embodiment, the nature of the advertising varies with the capabilities of the receiving devices; for example, it may not be useful for the GPS device 410 to display a coupon. As a result, the GPS device 410 may instead save a location for the relevant entity. As seen in FIG. 4, in certain embodiments, the GPS device 410 saves the location sent by the digital radio receiver 110 so that the user 106 can easily find that location. In contrast, the cellular phone 420 may display a coupon for the advertising entity.

In certain embodiments, the digital radio receiver 110 may text the advertising to the cellular phone 420. In other embodiments, the digital radio receiver 110 sends the advertising to an email address accessible from the cellular phone 420. As a result, the user 106 may have advertising presented to her in a much more useful way, and in a way which is more likely to result in the user 106 acting on the advertisement.

As discussed above, the digital radio receiver 110 may send the same advertising information to each device (such as GPS device 410 and cellular phone 420) and allow the devices to make decisions as to which components of the advertising to display for the user 106. In other embodiments, the digital radio receiver 110 sends only certain components of the advertising to certain devices 104a-c, based on the capabilities of the devices 104a-c.

Thus, in the example shown in FIG. 4, the user 106 is able to receive multiple forms of advertising on multiple devices 104a-c. The nature of the advertising may be tailored to the unique capabilities of the devices 104a-c.

Figure 5:
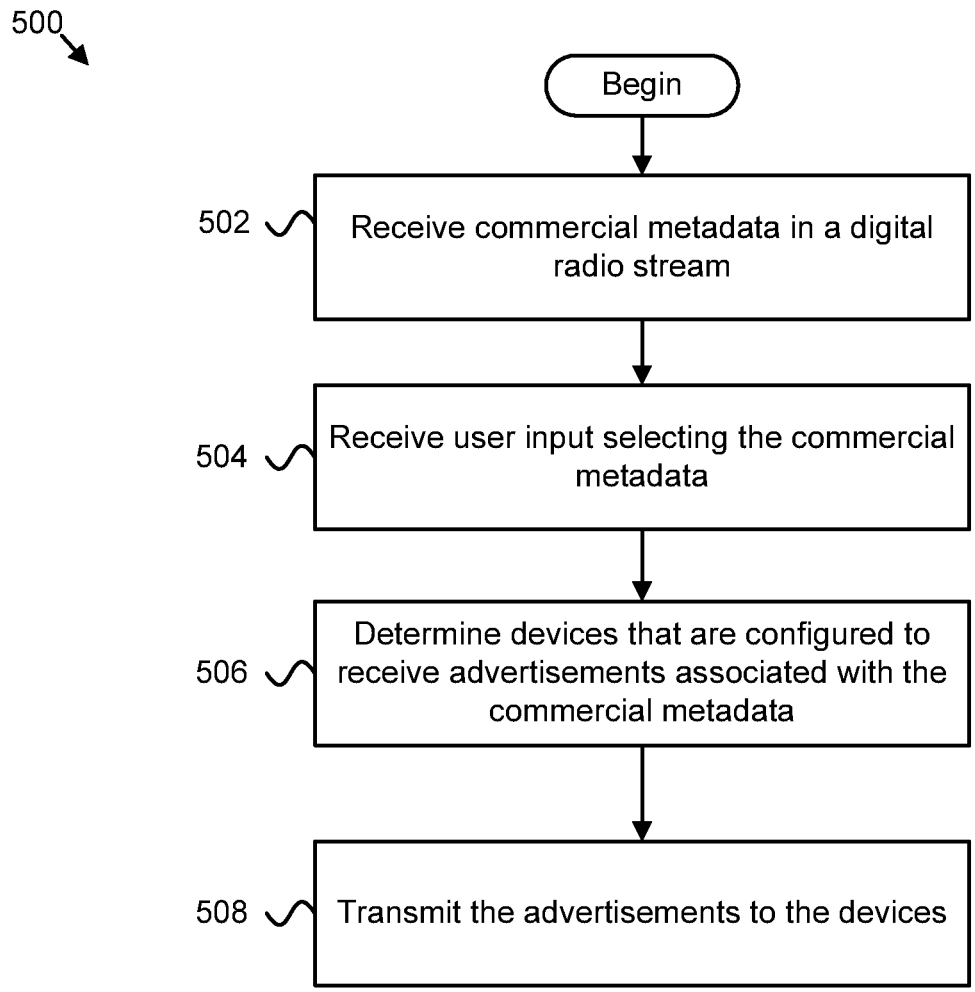
FIG. 5 is a flow chart diagram illustrating one embodiment of a method for commercial information tagging.

FIG. 5 shows one embodiment of a method 500 for commercial information tagging. The method may begin with receiving 502 the commercial metadata in a digital radio stream. The method may also include receiving 402 user input selecting the commercial metadata. The method may also include determining 506 one or more devices, from a set of devices that are communicatively connected to the digital radio receiver, that are configured to receive advertising associated with the commercial metadata. The advertising may be a location, a coupon, a promotion, or other form of advertising. The method may involve transmitting 508 the advertising to the communicatively connected devices. The transmission may be made using MMS, email, a proprietary exchange protocol, or other approach to sharing data between communicatively connected devices.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer-readable storage medium having stored thereon a plurality of computer-executable instructions which, when executed by a computer, cause the computer to:

receive a digital radio stream via a digital radio receiver, the digital radio stream comprising content data and commercial data;

receive a user input selecting a segment of the commercial data to tag an advertisement in the selected segment of the commercial data, the selected segment of the commercial data associated with commercial metadata associated with advertising components related to the tagged advertisement;

in response to receiving the user input, determine, from a set of devices communicatively connected to the digital radio receiver, first and second devices that each receive the advertising components associated with the commercial metadata, the advertising components comprising a first component of advertising and a second component of advertising; and transmit the first component of advertising and the second component of advertising to both the first device and the second device, wherein:

the first device presents the first component of advertising to a user and ignores the second component of advertising, the second device presents the second component of advertising to the user and ignores the first component of advertising, the first device and the second device are different types of device, and the first component of advertising and the second component of advertising are different types of component of advertising.

2. The computer-readable storage medium of claim 1, wherein:

the first component of advertising comprises one of a coupon, a promotion, a location, directions to the location, and contact information; and the second component of advertising comprises a different one of the coupon, the promotion, the location, the directions to the location, and the contact information.

3. The computer-readable storage medium of claim 1, wherein:
the first device is a global positioning system (GPS) device;
the first component of advertising comprises one of a location and directions to the location;
the GPS device displays the one of the location and the directions to the location for a user upon receiving the first component of advertising;
the second device is a phone;
the second component of advertising comprises one of a promotion, a coupon, and contact information; and
the phone displays the one of the promotion, the coupon, and the contact information for the user upon receiving the second component of advertising.

4. The computer-readable storage medium of claim 1, wherein the digital radio receiver transmits the first component of advertising to the first device using a multimedia messaging service (MMS).

5. The computer-readable storage medium of claim 1, wherein the digital radio receiver transmits the first component of advertising to the first device using electronic mail.

6. The computer-readable storage medium of claim 1, wherein:
the first device is one of a cellular phone, a digital music player, a global positioning system (GPS) device, a printer, and a computer; and
the second device of a different one of the cellular phone, the digital music player, the GPS device, the printer, and the computer.

7. The computer-readable storage medium of claim 1, wherein the digital radio receiver and at least one of the first and second devices are included in a same physical case.

8. A system for commercial information tagging, the system comprising:
a digital radio receiver that:
receives a digital radio stream comprising content data and commercial data;
receives user input from a user selecting a segment of the commercial data to tag an advertisement in the selected segment of the commercial data, the selected segment of the commercial data associated with commercial metadata associated with advertising components related to the tagged advertisement;
in response to receiving the input from the user, determines, from a set of devices communicatively connected to the digital radio receiver, first and second devices that can receive the advertising components associated with the commercial metadata; and
transmits the advertising components to the first and second devices;
wherein:
the first device presents a first component of advertising of the advertising components to a user and ignores a second component of advertising of the advertising components,
the second device presents the second component of advertising to the user and ignores the first component of advertising,
the first device and the second device are different types of device, and the first component of advertising and the second component of advertising are different types of component of advertising.

9. The system of claim 8, wherein:
the first component of advertising includes one of a coupon, a promotion, a location, directions to the location, and contact information; and
the second component of advertising comprises a different one of the coupon, the promotion, the location, the directions to the location, and the contact information.

10. The system of claim 8, wherein:
the first device is a phone;
the first component of advertising comprises one of a promotion, a coupon, a barcode, and contact information;
the phone displays the one of the promotion, the coupon, the barcode, and the contact information to the user in response to receiving the first component of advertising;
the second device is a global positioning system (GPS) device;
the second component of advertising comprises one of a location and directions to the location; and
the GPS device displays the one of the location and the directions to the location to the user in response to receiving the second component of advertising.

11. The system of claim 8, wherein the digital radio receiver transmits the first component of advertising to the first device using a multimedia messaging service (MMS).

12. The system of claim 8, wherein the digital radio receiver transmits the first component of advertising to the first device using electronic mail.

13. The system of claim 8, wherein:
the first device is one of a cellular phone, a digital music player, a global positioning system (GPS) device, a printer, and a computer; and
the second device of a different one of the cellular phone, the digital music player, the GPS device, the printer, and the computer.

14. The system of claim 8, wherein the digital radio receiver and at least one of the first and second devices are contained in a same physical case.

15. A method comprising:
receiving content data and commercial data in a digital radio stream with a digital radio receiver;
receiving a user input selecting a segment of the commercial data to tag an advertisement in the selected segment of the commercial data, the selected segment of the commercial data associated with commercial metadata associated with advertising components related to the tagged advertisement;
in response to receiving the user input, determining, from a set of devices communicatively connected to the digital radio receiver, first and second devices that can receive the advertising components associated with the commercial data, the advertising components including a first component of advertising and a second component of advertising; and
transmitting the first component of advertising and the second component of advertising to both the first device and the second device,
wherein:
the first device presents the first component of advertising to a user and ignores the second component of advertising, the second device presents the second component of advertising to the user and ignores the first component of advertising, the first device and the second device are different types of device, and the first component of advertising and the second component of advertising are different types of component of advertising.

16. The method of claim 15, wherein:

the first component of advertising includes one of a coupon, a promotion, a location, directions to the location, and contact information; and the second component of advertising comprises a different one of the coupon, the promotion, the location, the directions to the location, and the contact information.

17. The method of claim 15, wherein:

the first device is a phone;

the first component of advertising comprises one of a promotion, a coupon, a barcode, and contact information;

the phone displays the one of the promotion, the coupon, the barcode, and the contact information to the user in response to receiving the first component of advertising;

the second device is a global positioning system (GPS) device;

the second component of advertising comprises one of a location and directions to the location; and the GPS device displays the one of the location and the directions to the location to the user in response to receiving the second component of advertising.

18. The method of claim 15, wherein the digital radio receiver transmits the first component of advertising to the first device using a multimedia messaging service (MMS).

19. The method of claim 15, wherein the digital radio receiver transmits the first component of advertising to the first device using electronic mail.

* * * * *